A. L. BRETT & H. L. PARKER.
SADDLE FOR MOTOR CYCLES.
APPLICATION FILED APR. 28, 1913.
1,091,800.
Patented Mar. 31, 1914.
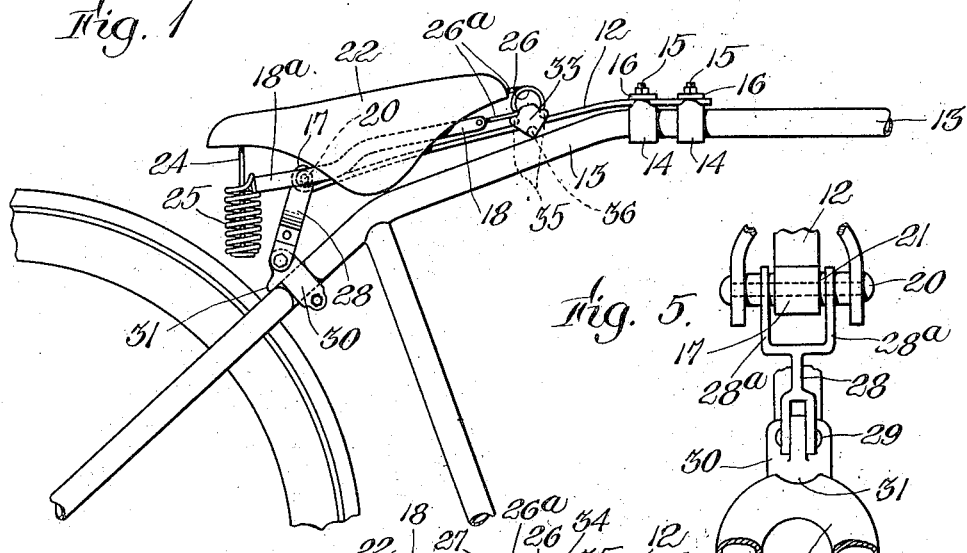
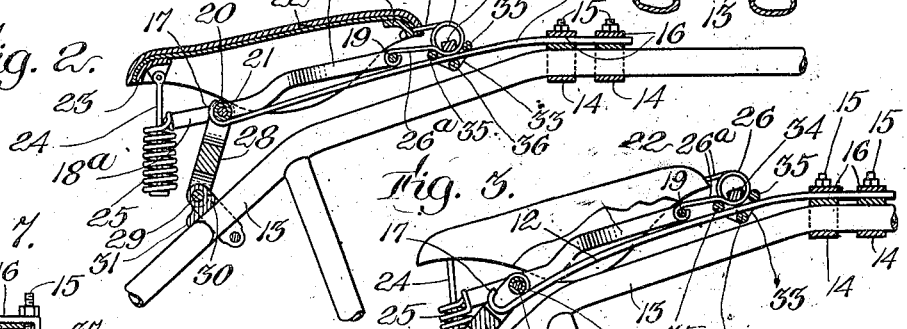
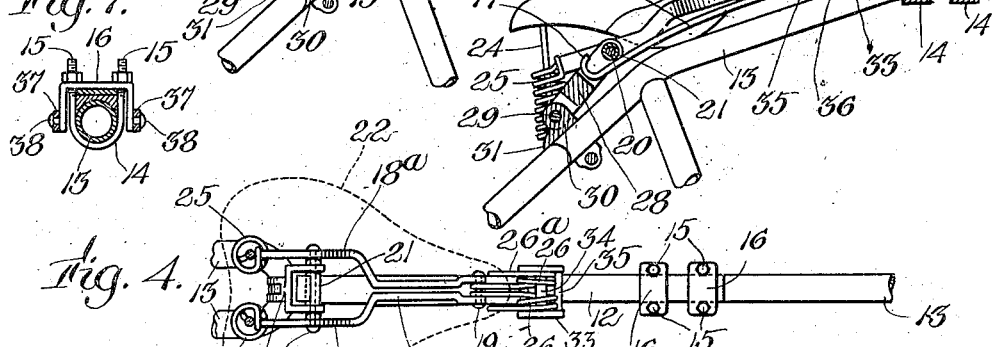
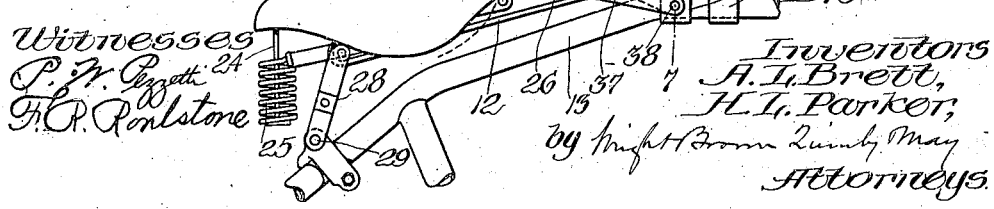

UNITED STATES PATENT OFFICE.

AFLEY LEONEL BRETT AND HERBERT LEWIS PARKER, OF BRAINTREE, MASSACHUSETTS.

SADDLE FOR MOTOR-CYCLES.

1,091,800. Specification of Letters Patent. Patented Mar. 31, 1914.

Application filed April 28, 1913. Serial No. 763,989.

*To all whom it may concern:*

Be it known that we, AFLEY LEONEL BRETT and HERBERT LEWIS PARKER, citizens of the United States, and residents of Braintree, in the county of Norfolk and State of Massachusetts, have invented certain new and useful Improvements in Saddles for Motor-Cycles, of which the following is a specification.

This invention has for its object to provide a motor cycle saddle the top or seat portion of which is located at a relatively low elevation so that the feet of the rider may touch the ground as occasion may require, and is yieldingly supported in such manner that when yielding vertically under the rider's weight, it also yields lengthwise in a forward direction, this compound movability distinguishing the saddle of our invention from all others of which we are aware, and being very desirable because it enhances the comfort of the rider when the front wheel strikes an obstruction.

Another object of the invention is to provide a saddle characterized as above stated, having means for raising the forward end or pommel of the saddle top when the top yields lengthwise, thus giving the top a more pronounced downward inclination from front to rear, when it yields under its load.

The invention consists in the improvements which we will now proceed to describe and claim.

Of the accompanying drawings: Figure 1 represents a side elevation of the saddle embodying our invention and a portion of the cycle frame to which it is applied. Fig. 2 represents a longitudinal section of the saddle. Fig. 3 represents a view similar to Fig. 2 showing the position of the saddle when it yields under its load. Fig. 4 is a top plan view of the saddle and a portion of the cycle frame, the saddle top being shown by dotted lines. Fig. 5 represents a rear end elevation of parts of the saddle mechanism. Fig. 6 represents a view similar to Fig. 1 showing means for raising the forward end of the saddle top when the top is yielding lengthwise. Fig. 7 represents a section on line 7—7 of Fig. 6.

The same reference characters indicate the same parts in all the figures.

In the drawings:—12 represents a base spring adapted to be attached at one end to the cycle frame 13, the spring being provided with means such as U-shaped clamps 14 having bolts 15, and clamping plates 16 engaged with said bolts and adapted to be pressed against the spring 12 by nuts on the bolts. The point of attachment of the base spring to the cycle frame is considerably in advance of the saddle, the spring projecting rearwardly over the frame 13 and having a free rear end which is preferably bent upwardly to form a stop 17 for a purpose hereinafter described. Above the base spring 12 is a rider bar 18 which is preferably composed of two members as shown by Fig. 4, said members being offset between the ends of the bar to form bifurcations 18$^a$ spaced apart from each other. The members of the rider bar are connected by transverse bolts 19 and 20. The rider bar is provided with an antifrictional truck or roll 21 which is in rolling contact with the upper side of the base spring 12 near the free end of the latter, said roll being preferably journaled on the connecting bolt 20 and located between the bifurcations 18$^a$.

22 represents the saddle top, the front and rear end portions of which are connected with the front and rear end portions of the rider bar 18, the connections being preferably resilient. In the embodiment of the invention here shown the cantle 23 of the saddle top has depending rods 24 pivoted to it, the lower ends of said rods supporting the lower ends of helical springs 25, the upper ends of which are attached to the bifurcations 18$^a$, said springs and rods constituting a resilient connection between the rear ends of the rider bar and saddle top. The other connection in this embodiment of the invention is provided by front springs 26 having central coiled portions and end portions forming arms 26$^a$, one of which is engaged with the bolt 19 at the forward end of the rider bar while the other is engaged with the reinforcing member 27 at the pommel of the saddle.

28 represents a link having bifurcations 28$^a$ at one end which are pivoted to the connecting bolt 20, the other end of the link being bifurcated and pivoted at 29 to an ear on a clamp 30 adapted to embrace and be secured to the cycle frame 13 at a point close to the forked portion of said frame, said clamp being preferably provided with an ear 31 which bears on the upper side of the forked portion of the frame and prevents the clamp 30 from turning.

The link 28 is forwardly inclined from its lower to its upper end, and when the saddle is depressed from its normal position shown by Figs. 1 and 2, to the position shown by Fig. 3, the inclination of the link is increased, the link causing the rider bar and saddle to move lengthwise in a forward direction while yielding vertically, so that when the saddle top is fully depressed, it is also moved lengthwise forward from its normal position, as will be seen by comparing Figs. 2 and 3. The roll 21 of the rider bar moves forward on the base spring away from the stop 17 during the described movements of the saddle. The base spring, in returning to its normal position, restores the rider bar, link and saddle top, to the relative positions shown by Fig. 2, the roll 21 being arrested by the stop 17 which therefore limits the rearward movement of the rider bar and saddle top. The link 28 connected as described with the cycle frame, prevents lateral displacement of the rear portions of the rider bar and saddle top.

The drawings represent different means for preventing lateral displacement of the forward end portions of the bar and top. In the construction shown by Figs. 1, 2, 3 and 4, the base spring 12 is utilized for the purpose last stated, a slide 33 being mounted on said spring and engaged with the forward springs 26. Said slide has a cross bar 34 which enters the eyes formed by the coiled portions of the springs 26, the transverse rods 35 and 36 which bear respectively on the upper and lower sides of the base spring. The slide 33 and the front springs 26 constitute a connection between the base spring and the rider bar and saddle top, permitting the described movements of the bar and top and preventing lateral displacement of the forward portions of the same.

The construction shown by Figs. 6 and 7 is the same in all respects as that shown in the preceding figures, excepting that the slide 33 is omitted and in place thereof, links 37 are employed, said links being pivoted at 38 to one of the clamps 7 and provided at their opposite ends with studs 39 which enter the eyes formed by the springs 26.

When the saddle and rider bar are in their normal positions, the links 37 are in the position shown by full lines in Fig. 6, said links being slightly inclined from a horizontal position. When the rider bar and saddle top are moved forward lengthwise as above described, the links 37 are swung upwardly and raise the forward end of the saddle top and bar as indicated by dotted lines in Fig. 6. It will be seen therefore that the links 37, while adapted to prevent lateral displacement of the forward portions of the saddle top and rider bar, are adapted also to increase the downward inclination of the saddle top from the front to the rear when the top yields lengthwise in a forward direction.

What we claim and desire to secure by Letters Patent is:—

1. A saddle comprising a base spring having means for attachment to a cycle frame, a rider bar supported by and movable on the base spring, a saddle top connected with the rider bar, and means engaged with the rider bar and engageable with the cycle frame for causing the saddle top and rider bar to move lengthwise in a forward direction when they are depressed.

2. A saddle comprising a base spring having means for attachment to a cycle frame, a rider bar supported by and movable on the base spring, a saddle top connected with the rider bar, and a link engaged at one end with the rider bar and adapted at its opposite end for engagement with the cycle frame, said link causing the rider bar and top to move lengthwise in a forward direction when they are depressed.

3. A saddle comprising a base spring having means for attachment to a cycle frame, a rider bar supported by and movable on the base spring, a saddle top connected with the rider bar, and means engaged with the rider bar and engageable with the cycle frame for causing the saddle top and rider bar to move lengthwise in a forward direction when they are depressed, the spring and rider bar being provided with stop members for limiting the endwise movements of the rider bar and saddle top in a rearward direction.

4. A saddle comprising a base spring having means for attachment to a cycle frame, a rider bar supported by and movable on the base spring, a saddle top connected with the rider bar, and means engaged with the rider bar and engageable with the cycle frame for causing the saddle top and rider bar to move lengthwise in a forward direction when they are depressed, means being provided for preventing lateral displacement of the said bar and top.

5. A saddle comprising a base spring having means for attachment to a cycle frame, a rider bar supported by and movable on the base spring, a saddle top connected with the rider bar, and means engaged with the rider bar and engageable with the cycle frame for causing the saddle top and rider bar to move lengthwise in a forward direction when they are depressed, said means preventing lateral displacement of the rear portions of the bar and top and additional means being provided for preventing lateral displacement of the forward portions of the bar and top.

6. A saddle comprising a base spring having means for attachment to a cycle frame, a rider bar supported by and movable on the base spring, a saddle top connected with the rider bar, and means engaged with the rider bar and engageable with the cycle frame for causing the saddle top and rider bar to move lengthwise in a forward direction when they are depressed, said means preventing lateral displacement of the rear portions of the bar and top and additional means being provided for preventing lateral displacement of the forward portions of the bar and top, said additional means having provisions for raising the forward ends of the bar and top.

7. A saddle comprising a base spring having means for attachment to a cycle frame, a rider bar supported by and movable on the base spring, a saddle top connected with the rider bar, means engaged with the rider bar and engageable with the cycle frame for causing the saddle top and rider bar to move lengthwise in a forward direction when they are depressed, said means preventing lateral displacement of the rear portions of the bar and top, and links engaged with the forward portions of the bar and top and adapted for engagement with the cycle frame, said links being adapted to prevent lateral displacement of the bar and top and to raise the forward ends thereof.

8. A saddle comprising a base spring having means for attachment to a cycle frame, a rider bar bifurcated at its rear end and having between its bifurcations a roll movable on the base spring, a saddle top above the rider bar, rear springs engaged with the bifurcations of the bar, and yieldingly supporting the rear end portion of the saddle top, front springs engaged with the rider bar and yieldingly supporting the forward end of the saddle top, the saddle top and bar being adapted to move vertically with the base spring and lengthwise independently thereof, means being provided for causing a forward endwise movement of the bar and top when they are depressed.

9. A saddle comprising a base spring having means for attachment to a cycle frame, a rider bar supported by and movable on the base spring, a saddle top connected with opposite ends of the bar, the said top and bar being movable vertically with the base spring and lengthwise independently thereof, a rear link engaged with the rear portion of the bar and having means at its opposite end for engagement with the cycle frame, and front links connected with the front end portion of the bar and having means for engagement with the cycle frame, said links being adapted to prevent lateral displacement of the bar and top, and the front links being adapted to raise the forward ends of the bar and top.

10. A saddle comprising a base spring having means for attachment to a cycle frame, a rider bar supported by and movable on the base spring, the rear portion of the bar being bifurcated, a saddle top above the rider bar, rear springs connecting the rear portion of the saddle top with the bifurcations of the bar, front springs connecting the forward portion of the saddle top with the forward end of the bar, and having coiled eye portions, a rear link engaged at one end with the bifurcations of the bar and having means at its opposite end for engagement with the cycle frame, and a front link engaged at one end with the eye portions of the front springs, and adapted at its opposite end for engagement with the cycle frame.

In testimony whereof we have affixed our signatures, in presence of two witnesses.

AFLEY LEONEL BRETT.
HERBERT LEWIS PARKER.

Witnesses:
ANNIE J. BRETT,
M. F. CUMING.